(12) United States Patent
Mueller et al.

(10) Patent No.: US 6,345,531 B1
(45) Date of Patent: Feb. 12, 2002

(54) MEASURING DEVICE FOR MEASURING THE MASS OF A FLOWING MEDIUM

(75) Inventors: Wolfgang Mueller, Rutesheim; Dieter Tank, Kornwestheim; Uwe Konzelmann, Asperg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,402
(22) PCT Filed: Jan. 28, 1999
(86) PCT No.: PCT/DE99/00207
  § 371 Date: Dec. 7, 1999
  § 102(e) Date: Dec. 7, 1999
(87) PCT Pub. No.: WO99/53276
  PCT Pub. Date: Oct. 21, 1999

(30) Foreign Application Priority Data

Apr. 8, 1998 (DE) .......................................... 198 15 656

(51) Int. Cl.[7] ................................................ G01F 1/68
(52) U.S. Cl. .................... 73/204.22; 73/202.5; 73/118.2
(58) Field of Search ............................... 73/202.5, 202, 73/204.26, 204.22, 204.21, 118.2

(56) References Cited

U.S. PATENT DOCUMENTS

| | | | | |
|---|---|---|---|---|
| 4,879,898 A | * | 11/1989 | Bamer ........................ | 73/118.2 |
| 4,974,445 A | * | 12/1990 | Arai et al. .................. | 73/118.2 |
| 4,986,116 A | * | 1/1991 | Usui et al. .................. | 73/118.2 |
| 5,467,648 A | * | 11/1995 | Igarashi et al. ............ | 73/202.5 |
| 5,696,321 A | * | 12/1997 | Igarashi et al. ............ | 73/202.5 |
| 5,892,146 A | * | 4/1999 | Kobayashi et al. ........ | 73/118.2 |

* cited by examiner

Primary Examiner—Harshad Patel
(74) Attorney, Agent, or Firm—Ronald E. Greigg

(57) ABSTRACT

A measuring device serves to measure the mass of a medium flowing in a line along the primary flow direction, in particular the mass of aspirated air of an internal combustion engine. The measuring device has a measuring element bathed by the flowing medium, which element is disposed in a measurement conduit provided in the line. The conduit extends in an axial direction from an inlet opening of the measurement conduit to a deflection conduit. The deflection conduit leads to an outlet opening that discharges into the line at an outer face of the measuring device. In the surroundings of the outlet opening, at least one protuberance is provided on the outer face of the measuring device that has the outlet opening.

17 Claims, 3 Drawing Sheets

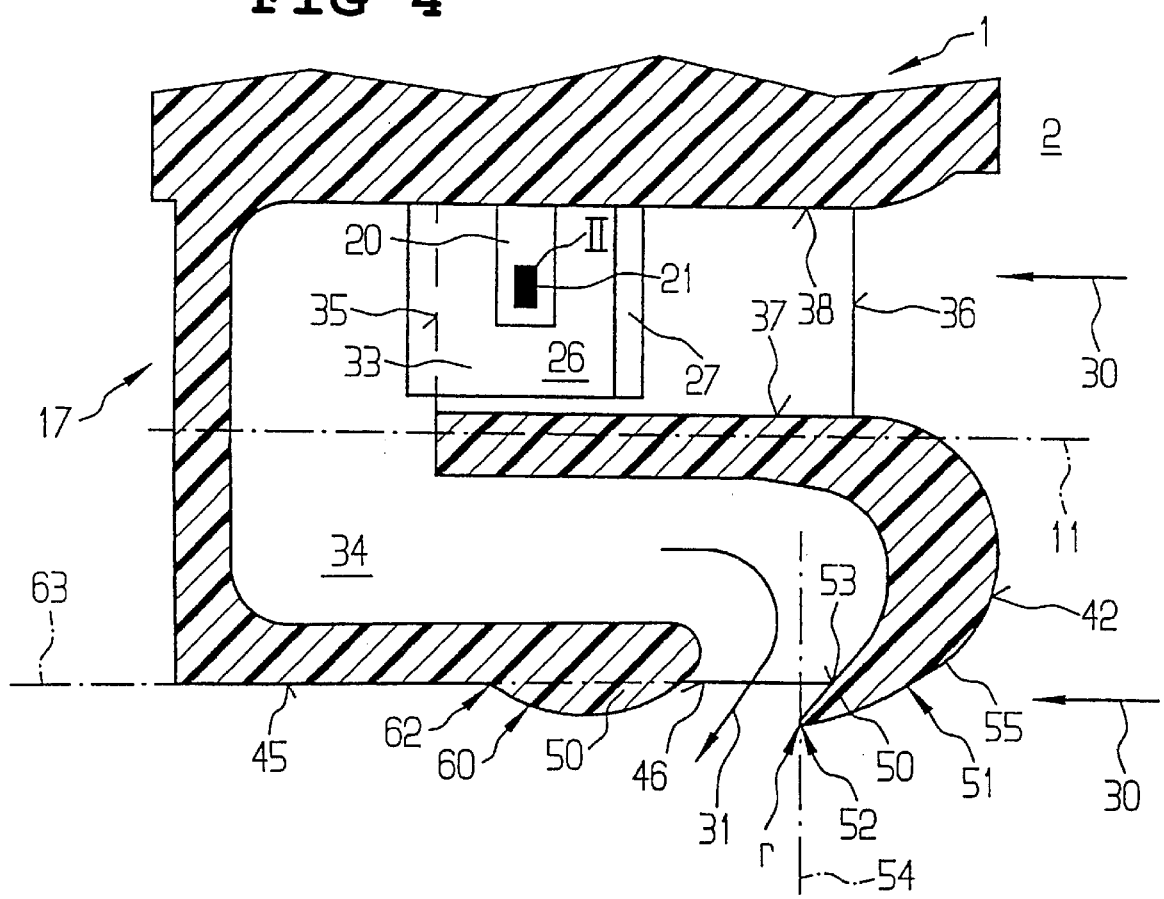

MEASURING DEVICE FOR MEASURING THE MASS OF A FLOWING MEDIUM

PRIOR ART

The invention is based on a device for measuring a mass of a flowing medium, also known as a flow rate meter.

A device has already been proposed in German Patent Disclosure DE 44 07 209 A1 that has a substrate body, extending crosswise to the flow of the medium, that is introduced in plug-in fashion into an opening made in a boundary wall of the flow. The boundary wall is for instance a wall of an intake tube, through which an internal combustion engine aspirates air from the environment. The substrate body has an elongated shape, and on its free end region protruding into the flowing medium it has a measurement conduit, through which the medium flows. A temperature-dependent measuring element, embodied by so-called micromechanical engineering, is accommodated in the measurement conduit. Such measuring elements are known, for instance from German Patent Disclosure DE 195 24 634 A1 and have a sensor region, produced on a chip-like substrate by being etched out of a silicon wafer; with a plurality of resistance layers, this sensor region forms at least one temperature-dependent measuring resistor. The sensor region occupies only a small portion of the substrate and has an extremely slight thickness, so that the sensor region can detect changes in the flow speed, which means changes in the mass of the flowing medium, with a fast reaction time.

In engine operation, the opening and closing of the inlet valves of the engine causes a highly pulsating flow in the intake tube which is turbulent in character. The influence of the pulsations in the flow is damped by accommodating the measuring element in the measurement conduit.

From German Patent Disclosure DE 44 41 874 A1, it is known to provide a flow obstacle, which causes a defined flow separation operative in the measurement conduit, at the inlet opening of the measurement conduit. This flow obstacle may for instance be a trip edge or a trip wire. This provision reduces the turbulence in the flow conduit, which in turn is expressed in reduced measurement signal noise.

From German Patent Disclosure DE 43 40 882 A1, it is known, in a measurement conduit of a device for measuring the mass of a flowing medium, to provide an internal sleeve with a friction face. At the friction face, eddies are induced, which vary the flow resistance and thus lead to an intended measurement correction. Instead of the inner sleeve, laminations can also be provided as means for varying the flow.

ADVANTAGES OF THE INVENTION

The measuring device according to the invention has an advantage over the prior art that by suitable dimensioning of the protuberance, the measuring device can be adapted with especially fine sensitivity, and systematic measurement errors caused by the flow pulsation can be eliminated or at least reduced. While the pulsation error is already roughly minimized by suitably dimensioning the length, flow resistance, and conduit cross section of the measurement conduit, a very finely sensitive variation and hence minimization of the pulsation error is attainable by optimizing the disposition, shape, length, height and other parameters of the protuberance provided in the surroundings of the outlet opening of the deflection conduit.

Advantageous refinements of and improvements to the measuring device defined herein are possible with the provisions recited herein after.

The protuberance can be provided both in an upstream ambient region of the outlet opening of the deflection conduit in terms of the primary flow direction in the line and in a downstream ambient region thereof in terms of the primary flow direction in the line. If the protuberance is provided upstream of the outlet opening, the pulsation error is shifted in the direction of an underindication. Conversely, if the protuberance is provided downstream of the outlet opening in terms of the primary flow direction, the pulsation error is shifted in the direction of an overindication.

If the protuberance is provided in the upstream ambient region of the outlet opening in terms of the primary flow direction, then the outlet opening preferably has a separation edge, which is embodied either with a sharp edge or has a very short radius of curvature. The protuberance is advantageously disposed such that the protuberance protrudes past the outlet opening; that is, a plane touching the separation edge and extending perpendicular to the primary flow direction in the line intersects the outlet opening. The protuberance preferably has a substantially triangular cross-sectional contour, where one corner of the triangular cross-sectional contour forms the separation edge and a further corner of the triangular cross-sectional contour coincides with an upstream end of the outlet opening.

If the protuberance is disposed in the downstream ambient region of the outlet opening in terms of the primary flow direction, then it is advantageous for the protuberance to be rounded, at least in an end region oriented in the primary flow direction. The protuberance is preferably shaped in undulating fashion and curved steadily in such a way that in the region downstream in terms of the flow direction in the line the protuberance changes over without forming an edge into a plain in which the outer face having the outlet opening extends. The result in the region of the protuberance is a relatively slight turbulence in the flow, and the protuberance presents only relatively slight flow resistance to the primary flow in the line.

BRIEF DESCRIPTION OF THE DRAWINGS

Exemplary embodiments of the invention are shown in simplified form in the drawings and described in further detail below. Shown are:

FIG. 4 is an enlarged sectional view of a detail in side view of a measuring device embodied according to the invention in which there is a protuberances are located both upstream and downstream of the outlet opening.

DESCRIPTION OF THE EXEMPLARY EMBODIMENTS

Figure 1:
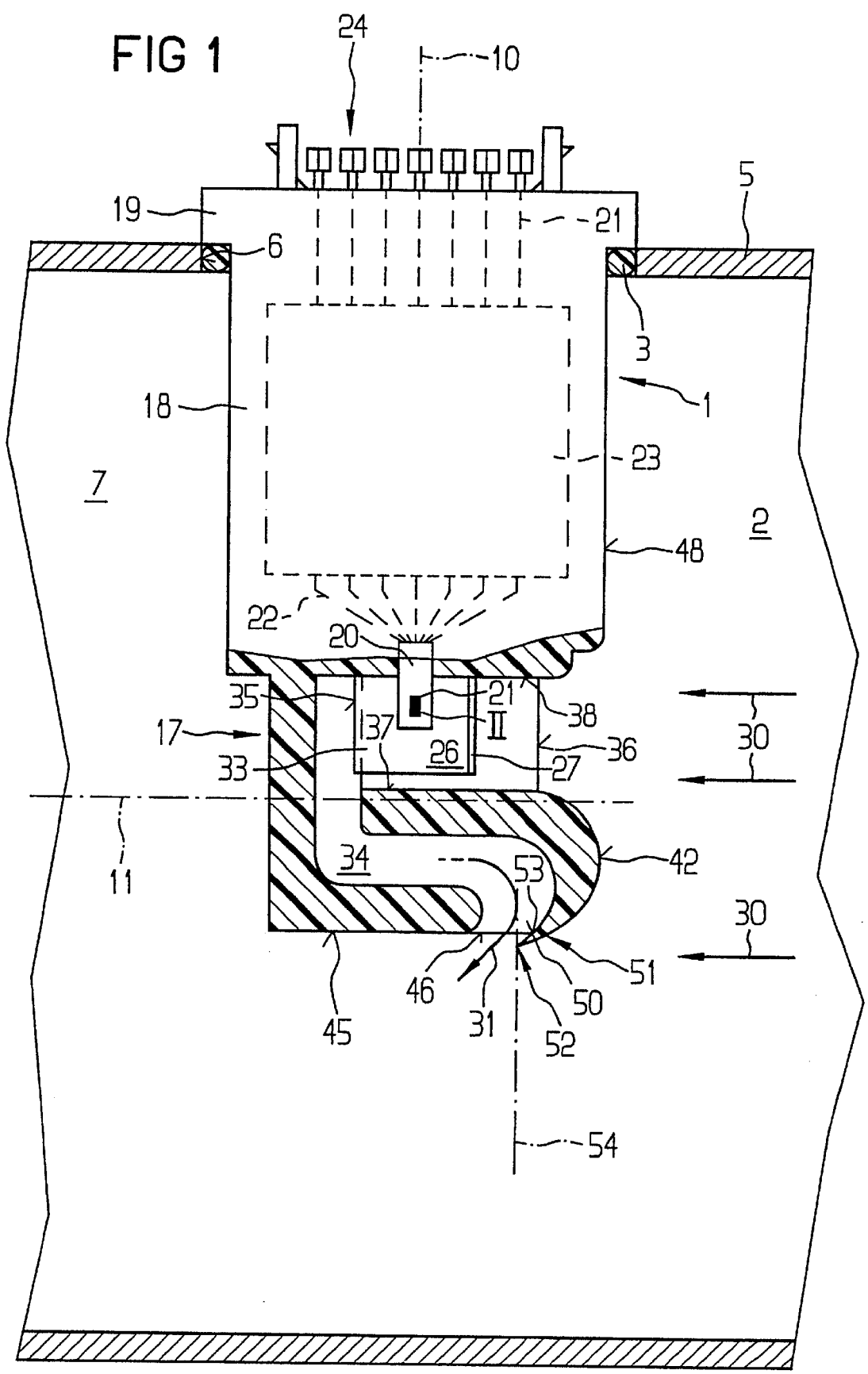
FIG. 1, in a fragmentary sectional view, shows a side view of a measuring device embodied according to the invention, in a first exemplary embodiment.

FIG. 1, in a fragmentary sectional view, shows a side view of a measuring device 1, which is used to measure the mass of a flowing medium, in particular the aspirated air mass of internal combustion engines.

The measuring device 1 preferably has a slender, block-like shape extending in elongated fashion in the direction of a longitudinal axis 10, and is introduced, for instance in plug-in fashion, into an opening 6 made in a boundary wall 5 of a line 2. The boundary wall 5 is for instance the wall of an intake tube through which the engine aspirates air from the environment. The boundary wall 5 defines a flow cross section 7, which in the case of a cylindrical intake tube, for instance, has an approximately circular cross section, in the center of which a center axis 11 extends axially, parallel to the boundary wall 5; in the exemplary embodiment, this center axis is oriented perpendicular to the longitudinal axis of the measuring device 1. The measuring device 1 is sealed off in the boundary wall 5 by means of a sealing ring 3 and is solidly joined to the boundary wall, for instance by means of a screw connection, not shown in detail.

With a part hereinafter called the measuring part 17, the measuring device 1 protrudes into the flowing medium; the measuring part 17 is divided symmetrically approximately in the middle of the flow cross section 7 by the center axis 11, so that the flowing medium approaches a temperature-dependent measuring element 20, accommodated in the measuring part 17, as much as possible without interfering peripheral influence from the boundary wall 5. In the exemplary embodiments shown in FIGS. 1, 2 and 3, the medium flows from right to left, and the primary flow direction is indicated by corresponding arrows 30. The measuring device 1 is integrally composed of the measuring part 17, a substrate part 18, and a holder part 19, and is made for instance of plastic by plastic injection molding. The measuring element 20 can be produced by so-called micromechanical engineering, by etching out a semiconductor body, such as a silicon wafer, and its construction can be learned for instance from DE 195 24 634 A1. The measuring element 20 has a diaphragm-like sensor region 21, which is bounded in FIGS. 1 and 2 by a line II and is made by being etched out. Tho sensor region 21 has an extremely slight thickness and has a plurality of resistor layers, also made by being etched out, which form at least one temperature-dependent measuring resistor and for instance one hot resistor.

It is also possible to provide the measuring element 20 in the form of a so-called hot-film sensor element, whose construction can also be learned from German published, non-examined Patent Application DE-OS 36 38 138. Such hot-film sensor elements likewise have individual resistor layers applied to a platelike substrate, and these layers include at least one temperature-dependent measuring resistor and for instance at least one hot resistor. The individual resistor layers of the measuring element 20 or of the sensor element 21 are electrically connected, by means of connecting lines 22 extending in the interior of the measuring device 1, to an electronic evaluation circuit 23 shown in dashed lines in FIG. 1. The electronic evaluation circuit 23 for instance includes a bridge-like resistance measuring circuit. The evaluation circuit 23 is accommodated for instance in the substrate part 18 or the holder part 19 of the measuring device 1. With a plug connector 24 provided on the holder part 19, the electrical signals furnished by the evaluation circuit 23 can be delivered for instance to a further electronic control unit for evaluation; this unit, among other functions, serves the purpose of electronic idling control or engine power control for the internal combustion engine. In the exemplary embodiment shown, the measuring element 20 is let into a chip 26, for instance of metal, which can have a knife edge 27 facing into the primary flow direction 30. No attempt will be made to describe the function and construction of the temperature-dependent measuring element 20 in detail here, because one skilled in the art can learn this from the prior art.

The measuring part 17 of the measuring device 1 has a block-like shape, for instance, with a measurement conduit 33 that extends axially in the measuring part 17 and with a deflection conduit 34 that has an S-shape, for instance. The measurement conduit 33 extends axially in the measuring part 17 in the direction of the center axis 11 from an inlet opening 36, of rectangular cross section, for instance, to an orifice 35. The measurement conduit 33 is bounded by a top face 38 that is more remote from the center axis 11 and a bottom face 37 closer to the center axis 11 as well as by two side faces. Instead of disposing the measurement conduit 33 eccentrically with respect to the center axis 11, it is also possible to dispose measuring conduit centrally or in the region of the center axis 11 of the boundary wall 5. In the measurement conduit 33, the platelike measuring element 20 is oriented with its greatest length radially in the direction of the longitudinal axis 10, and it is divided symmetrically by this axis. The measuring element 20 is held on one side, by one of its narrow ends, in the substrate part 18 on the top face 38, so that its two side faces are bathed by the medium approximately parallel to the center axis 11. The medium flows from the inlet opening 36 of the measurement conduit 33 to the measuring element 20 and from there into the deflection conduit 34, and then leaves the deflection conduit 34 radially, in the direction of an arrow 31 shown in FIGS. 1 and 2, from an outlet opening 46.

The medium flowing out of the outlet opening 46 then mixes again with the medium bathing the measuring device 1. The outlet opening 46, like the deflection conduit 34, has a rectangular cross section, for instance, and is provided on an outer face 45 of the measuring part 17, which face is oriented parallel to the center axis 11. Transversely to the lower outer face 45, a peripheral face 42 of the measuring part 17 facing into the primary flow direction 30 adjoins the rectangular outlet opening 46 upstream, in terms of the primary flow direction 30; upstream of the inlet opening 36, it leads in rounded form from the outer face 45 to the lower face 37 of the measurement conduit 33, as far as the inlet opening 36.

According to the invention, on the outer face 45 of the measuring device 1 that has the outlet opening 46, at least one protuberance 50 is provided in the surroundings of the outlet opening 46.

In the exemplary embodiment shown in FIG. 1, the protuberance 50 is disposed in an upstream ambient region 51 of the outlet opening 46 in terms of the primary flow direction 30 and has a separation edge 51. In the exemplary embodiment shown in FIG. 1, the separation edge is embodied with a sharp edge.

Figure 2:
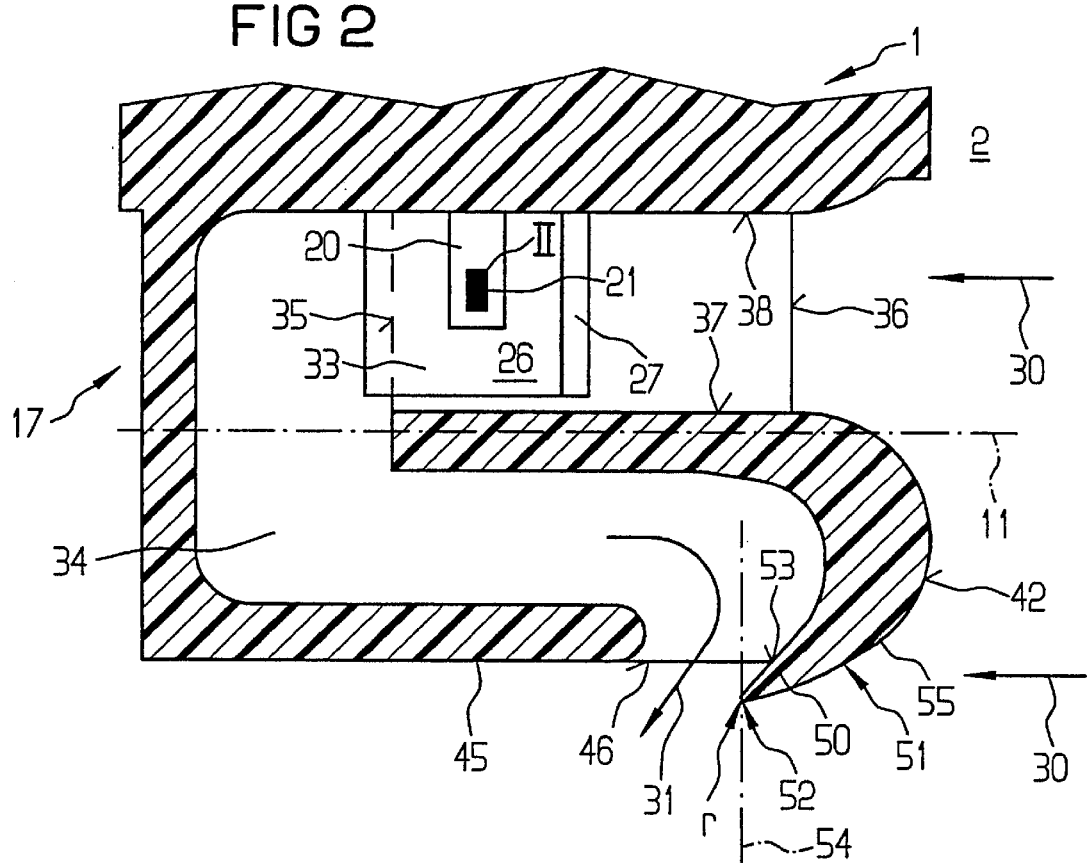
FIG. 2 is an enlarged sectional view of a detail in a side view of a measuring device embodied according to the invention in a second exemplary embodiment.

FIG. 2 shows the measuring device 1 in the region of the center axis 11 in an enlarged view. Elements already described are provided with the same reference numerals. The difference from the exemplary embodiment shown in FIG. 1 is solely that the separation edge 52, in the exemplary embodiment shown in FIG. 2, is not embodied with a sharp edge but instead has a very short radius of curvature r. Both in the exemplary embodiment with the sharply pointed separation edge 52 shown in FIG. 1 and in the exemplary embodiment with the rounded separation edge 52 shown in FIG. 2, the protuberance 50 protrudes past the upstream end 53 of the outlet opening 46, in terms of the primary flow direction 30. In other words, a plain 54 that touches the separation edge 52 and extends perpendicular to the primary flow direction 30 in the line 2 intersects the outlet opening 46. The protuberance 50 has a substantially triangular cross-sectional contour, and one corner of the triangular cross-sectional contour forms the separation edge 52 and another corner of the triangular cross-sectional contour coincides with the upstream end 53, in terms of the primary flow direction 30 in the line 2, of the outlet opening 46. A third corner of the triangular cross-sectional contour forms a contact point 55, at which the protuberance 50 changes into the curved peripheral face 42.

As a result of the disposition of the protuberance 50 in the upstream ambient region 51 of the outlet opening 46 in terms of the primary flow direction 30, it is attained that a pulsation error that would occur as a systematic measurement error if there were no protuberance 50 is shifted in the direction of an underindication and is therefore compensated for.

Figure 3:
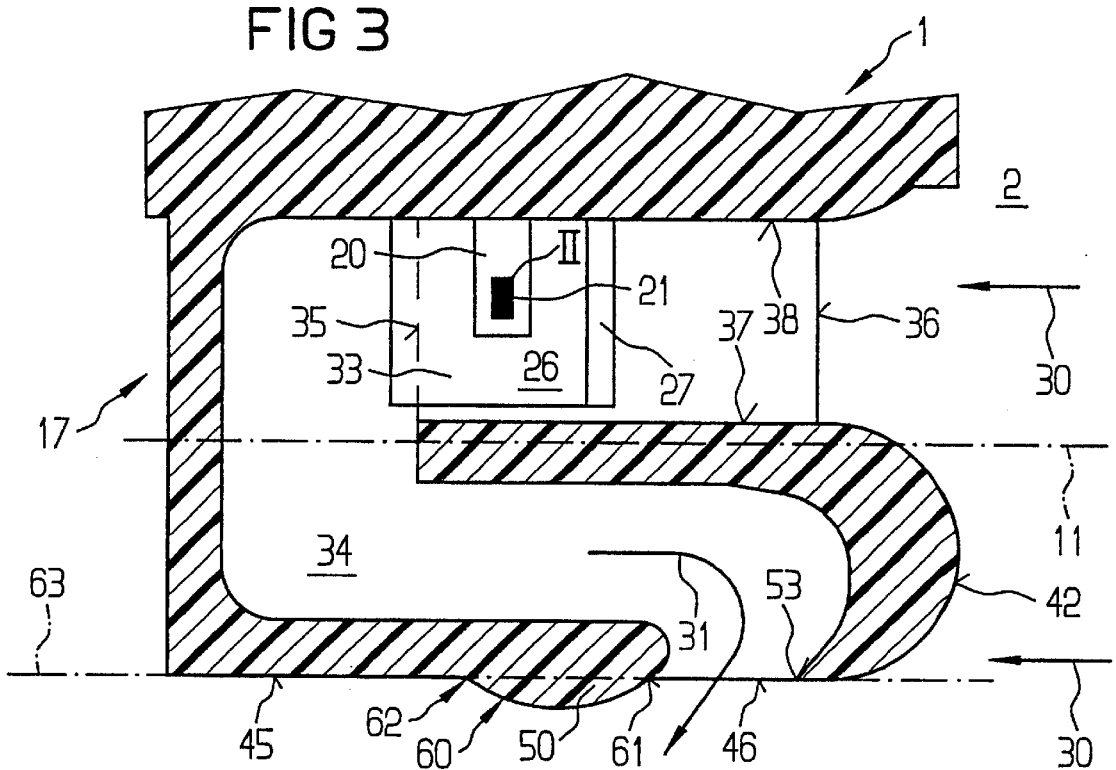
FIG. 3 is an enlarged sectional view of a detail in a side view of a measuring device embodied according to the invention in a third exemplary embodiment.

FIG. 3 shows a third exemplary embodiment of the measuring device 1 of the invention, in which the protuberance is disposed in a downstream ambient region 60 of the outlet opening 46 in terms of the primary flow direction 30. The protuberance 50 here is shaped in undulating fashion in an end region 61 facing into the primary flow direction 30. A backup pressure is built up in the end region 61 of the protuberance 50 that makes for a more difficult flow through the measurement conduit 33 and deflection conduit 34. A pulsation error occurring as a systematic measurement error is shifted in the direction of an overindication and can be compensated for accordingly. At the same time, in the event of a reverse flow in the line 2 counter to the primary flow direction 30, a flow through the deflection conduit 34 and the measurement conduit 33 in the reverse direction is counteracted.

As can be seen from FIG. 3, the protuberance 50 in the exemplary embodiment shown in FIG. 3 is steadily curved, and in the downstream region 62 in terms of the primary flow direction 30, it changes over without forming an edge into a plane 63, in which the outer face 45 having the outlet opening 46 extends.

While pulsation errors that occur in practice can already be roughly minimized by suitable dimensioning of the length, flow resistance and conduit cross section of the measurement conduit 33 and deflection conduit 34, it is possible by means of the at least one protuberance 50 provided according to the invention in the ambient region of the outlet opening 46 of the deflection conduit 34 to compensate for the pulsation errors with very fine sensitivity and thus to eliminate them. Depending on whether the measuring device 1 without the protuberances 50 has a tendency to an underindication or an overindication because of the pulsation errors, the protuberance 50 should be disposed either in the upstream ambient region 51 in terms of,the primary flow direction 30, as in the exemplary embodiments shown in FIGS. 1 and 2, or in the downstream ambient region 60 of the outlet opening 46 in terms of the primary flow direction 30, as in the exemplary embodiment shown in FIG. 3. Tests have shown that increasing the height of the protuberance 50 by even approximately 0.5 mm leads to a 5% to 10% reduction in the pulsation error. By optimizing the height and shape of the protuberance 50, the pulsation error can therefore be extensively reduced, or even eliminated.

The foregoing relates to a preferred exemplary embodiments of the invention, it being understood that other variants and embodiments thereof are possible within the spirit and scope of the invention, the latter being defined by the appended claims.

What is claimed is:

1. A measuring device (1) for measuring the mass of a medium flowing in a line (2) along a primary flow direction (30), in the mass of aspirated air of an internal combustion engine, comprising: said measuring device having an outer face, a measuring element (21) bathed by the flowing medium, said measuring element is disposed in a measurement conduit (33) provided in the line (2), said measurement conduit (33) extends in an axial direction from an inlet opening (36) of the measurement conduit (33) to a deflection conduit (34) that leads to an outlet opening (46) that discharges into the line (2) at said outer face (45) of the measuring device (1), in the surroundings of the outlet opening (46), at least one protuberance (50) is provided on the outer face (45) of the measuring device (1) that has the outlet opening (46), in which the at least one protuberance (50) is disposed in a downstream ambient region (60) of the outlet opening in terms of the primary flow direction (30).

2. The measuring device according to claim 1, in which the at least one protuberance (50) is rounded, at least in an end region (61) oriented toward the primary flow direction (30).

3. The measuring device according to claim 2, in which the at least one protuberance (50) is shaped in undulating fashion.

4. The measuring device according to claim 3, in which the at least one protuberance (50) is steadily curved and changes over, in the downstream region (62) with respect to the primary flow direction (30) in the line (2), without forming an edge into a plane (63), in which the outer face (45) having the outlet opening (46) extends.

5. The measuring device according to claim 2, in which the at least one protuberance (50) is steadily curved and changes over, in the downstream region (62) with respect to the primary flow direction (30) in the line (2), without forming an edge into a plane (63), in which the outer face (45) having the outlet opening (46) extends.

6. A measuring device (1) for measuring the mass of a medium flowing in a line (2) along a primary flow direction (30), in the mass of aspirated air of an internal combustion engine, comprising: said measuring device having an outer face, a measuring element (21) bathed by the flowing medium, said measuring element is disposed in a measurement conduit (33) provided in the line (2), said measurement conduit (33) extends in an axial direction from an inlet opening (36) of the measurement conduit (33) to a deflection conduit (34) that leads to an outlet opening (46) that discharges into the line (2) at said outer face (45) of the measuring device (1), in the surroundings of the outlet opening (46), at least one protuberance (60) is provided on the outer face (45) of the measuring device (1) that has the outlet opening (46), in which one protuberance (50) is disposed in an upstream ambient region (51) of the outlet opening (46) in terms of the primary flow direction (30), and another protuberance is disposed in a downstream ambient region (60) of the outlet opening in terms of the primary flow direction (30).

7. The measuring device according to claim 6, in which the protuberance which is in tho upstream ambient region has a separation edge, and a plane (54), that touches the separation edge (52) and extends perpendicular to the primary flow direction (30) of the line (2) intersects the outlet opening (46).

8. The measuring device according to claim 6, in which the protuberance (50) which is in the upstream ambient region has a substantially triangular cross-sectional contour, in which one corner of the triangular cross-sectional contour forms the separation edge (52), and another corner of the triangular cross-sectional contour coincides with an upstream end (53) of the outlet opening (46), in terms of the primary flow direction (30) in the line (2).

9. A measuring device (1) for measuring the mass of a medium flowing in a line (2) along a primary flow direction (30), in the mass of aspirated air of an internal combustion engine, comprising: said measuring device having an outer face, a measuring element (21) bathed by the flowing medium, said measuring element is disposed in a measurement conduit (33) provided in the line (2), said measurement conduit (33) extends in an axial direction from an inlet opening (36) of the measurement conduit (33) to a deflection conduit (34) that leads to an outlet opening (46) that discharges into the line (2) at said outer face (45) of the measuring device (1), in the surroundings of the outlet opening (46), at least one protuberance (50) is provided on the outer face (45) of the measuring device (1) that has the outlet opening (46), in which the at least one protuberance (50) is disposed in an upstream ambient region (51) of the outlet opening (46) in terms of the primary flow direction (30) and has a separation edge (52), and in which a plane (54) that touches the separation edge (52) and extends perpendicular to the primary flow direction (30) of the line (2) intersects the outlet opening (46).

10. The measuring device according to claim 9, in which the separation edge (52) is sharply pointed.

11. The measuring device according to claim 9, in which the separation edge (52) has a very small radius of curvature (r).

12. The measuring device according to claim 11, in which the at least one protuberance (50) has a substantially triangular cross-sectional contour, in which one corner of the triangular cross-sectional contour forms the separation edge (52), and another corner of the triangular cross-sectional contour coincides with an upstream end (53) of the outlet opening (46), in terms of the primary flow direction (30) in the line (2).

13. The measuring device according to claim 9, in which the at least one protuberance (50) has a substantially triangular cross-sectional contour, in which one corner of the triangular cross-sectional contour forms the separation edge (52), and another corner of the triangular cross-sectional contour coincides with an upstream end (53) of the outlet opening (46), in terms of the primary flow direction (30) in the line (2).

14. A measuring device (1) for measuring the mass of a medium flowing in a line (2) along a primary flow direction (30), in the mass of aspirated air of an internal combustion engine, comprising: said measuring device having an outer face, a measuring element (21) bathed by the flowing medium, said measuring element is disposed in a measurement conduit (33) provided in the line (2), said measurement conduit (33) extends in an axial direction from an inlet opening (36) of the measurement conduit (33) to a deflection conduit (34) that leads to an outlet opening (46) that discharges into the line (2) at said outer face (45) of the measuring device (1), in the surroundings of the outlet opening (46), at least one protuberance (50) is provided on the outer face (45) of the measuring device (1) that has the outlet opening (46), in which one protuberance (50) is disposed in an upstream ambient region (51) of the outlet opening (46) in terms of the primary flow direction (30), and another protuberance is disposed in a downstream ambient region (60) of the outlet opening in terms of the primary flow direction (30), wherein the upstream protuberance has a separation edge (52), and in which a plane (54) that touches the separation edge (52) and extends perpendicular to the primary flow direction (30) of the line (2) intersects the outlet opening (46).

15. The measuring device according to claim 14, in which the protuberance (50) which is in the upstream ambient region has a substantially triangular cross-sectional contour, in which one corner of the triangular cross-sectional contour forms the separation edge (52), and another corner of the triangular cross-sectional contour coincides with an upstream end (53) of the outlet opening (46), in terms of the primary flow direction (30) in the line (2).

16. The measuring device according to claim 14, in which the separation edge (52) which is upstream of the outlet opening is sharply pointed.

17. The measuring device according to claim 14, in which the separation edge (52) which is upstream of the outlet opening has a very small radius of curvature (r).

* * * * *